March 28, 1939. H. FÖTTINGER Re. 21,035

HYDRAULIC TRANSMISSION GEAR

Original Filed April 4, 1934

Inventor:
Hermann Föttinger
By
Bonnelycke, Young, Emery & Thompson
Attorneys

Reissued Mar. 28, 1939 Re. 21,035

UNITED STATES PATENT OFFICE 21,035

HYDRAULIC TRANSMISSION GEAR

Hermann Föttinger, Berlin-Wilmersdorf, Germany

Original No. 2,116,461, dated May 3, 1938, Serial No. 719,008, April 4, 1934. Application for reissue January 9, 1939, Serial No. 250,076

6 Claims. (Cl. 60—54)

In the well-known hydraulic transmission gears or turbo-transformers which consist of pump wheels, turbine wheels and guide wheels the speed of the turbine wheels, viz. the secondary wheels, changes within wide limits in accordance with the resistance to be overcome. The speed of the pump wheels being kept constant, the normal speed and the highest efficiency will be obtained with a definite torque of the turbine, viz. the so-called normal torque of the turbine wheels. When the speed of the turbine is reduced, for instance at starting or by hard braking, the torque of the turbine increases by itself and the amount of increase will be dependent on the number, the radii and the blading of the turbine wheels and the guide apparatus as well as of the type of the pump. As the speed of the turbine increases, the torque inversely decreases until in the case of no-load work the torque has dropped to zero. When hydraulic transmissions are built in, e. g. into automobiles, various tractive efforts, that is various torques must be successively overcome. Consequently the speed of the turbine adjusts itself according to the torque to be overcome and thus also the running speed of the car is automatically adapted without steps to the amount attainable. Therefore the decrease of the speed is automatically accompanied by an increase of the torque.

The hydraulic transmission gears hitherto built were as a rule intended for ships and similar purposes where an increase of torque for starting would be unnecessary and useless. The only intention was to arrive at a maximum efficiency with the normal run. Of course, also in this instance a corresponding increase of the torque took place at starting, viz. with the minimum of angular speed, and in such a way that the starting torque amounted to about double the normal torque and the no-load speed to about double the normal speed of the turbine. The curve of the efficiency was similar to a parabola the vertex of which coincides with the point of normal speed.

In the case of land vehicles, lifting machinery etc. it is desirable that the tractive effort, viz. the torque be increased at starting as much as possible by a suitable design of the hydraulic system. The ideal shape of the speed curve would be the so-called "ideal tractive-effort hyperbola" which, however, could be arrived at only in the case of gears free of loss and would result at an infinitely large tractive effort in the start. The ideal tractive-effort hyperbola can, of course, not be attained in a transmission gear practically built, although it would be the most ideal design for the use on land vehicles etc.

Now, it is an object of the present invention to provide for a hydraulic transmission gear which is particularly suited for land vehicles, lifting machinery and the like and shows a torque or tractive effort curve as favorable as possible, that is a torque curve which lies between the ideal tractive-effort parabola and the straight-line increase of torque actually prevailing in the hydraulic transmission gears already known.

The novel means found out for the solution of this problem and further improvements of the hydraulic transmission gear as detailedly specified in the following description are the subject matter of the present invention. The accompanying drawing shows several embodiments of the invention, and in them Fig. 1 is a chart of the dependencies prevailing between torque, speed and efficiency in prior transmission gears, this chart explaining the object of the present invention.

Figure 1:
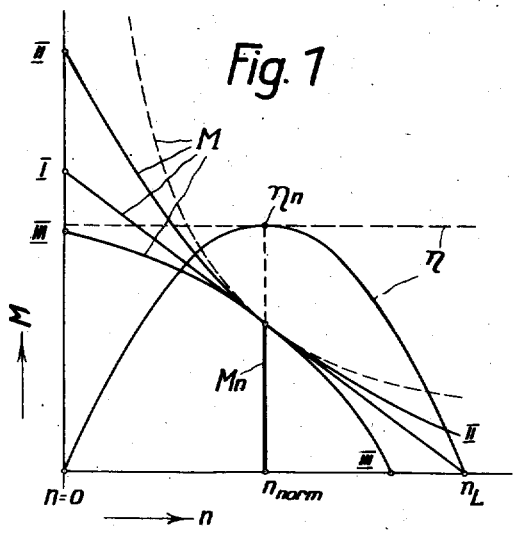

In the chart, Fig. 1, the abscissae represent the angular speeds and the ordinates the torques. With a normal speed $n_{norm}$ the normal torque is Mn. When the speed is decreased, the torque increases; when, however, the speed rises, the torque drops.

In the well-known earlier constructions of the inventor the latter used turbines with an admission directed to the interior (Francis type) with three to five turbine stages or there were used two or three complete turbine circuits with the same direction of rotation. This arrangement resulted in torque curve M designated by I in Fig. 1, viz. in a straight line. At the start the torque was about double as high as the normal torque Mn and when running without load the speed $n_L$ was about double as high as the normal speed.

Another well-known transmission gear (the Rieseler gear U. S. Patent No. 1,727,903) has a torque line designated by III in Fig. 1, when running in the hydraulic circuit with a two-stage turbine and a guide device alternately immobilized by hard braking or running free. In this instance the starting torque is even lower so that this arrangement is still less suitable for land vehicles, lifting machinery etc.

In the other transmission gears known, for instance the Lysholm-Ljungström gears (U. S. Patent No. 1,900,120) a great many turbine steps, but at least three stages with radial blading are used and particularly steep outlet angles are provided for. Also in that instance the intention was to fully remove the tangential component $c_u$ of the absolute velocity of flow prior to the return of the water into the pump (so-called vertical admission). This resulted in a curve like that designated by II in Fig. 1 and which is much more advantageous than curve I. It lies between the latter and the dotted "ideal tractive-effort hyperbola" as plotted in Fig. 1 which also comprises the parabolic curve of the efficiency $\eta$.

In order to obtain torques similar to those represented by curve II, Coats (U. S. Patent 1,760,397) further made use of a guide apparatus which comprises one fixed guide blade rim and four movable guide blade rims, which are either allowed to freely revolve or the blades of which can freely turn. This turbine was of the Francis type with a small inlet radius and a large outlet radius.

It is obvious from this that as far as it was possible to arrive at a torque curve lying between the straight torque line I and the ideal hyperbola, it was necessary to make use of very intricate designs.

Now, the inventor has found out that degrees of increase of the tractive effort, viz. torque curves like those shown by II and which were attained, so far, only with at least three turbine stages (six wheels) or with one fixed and four revoluble guide blade rims (seven wheels), can already be arrived at with one single turbine stage in one circuit comprising three fixed wheels, accordingly with a fraction of the means hitherto necessary for that purpose.

This effort absolutely unexpected and diametrically opposed to the notion of other specialists is, according to the invention, substantially obtained by the essential combination of the following features, namely:

(*a*) In the cycle there is disposed in combination with a pump wheel only the one secondary wheel the inlet radius of which does not exceed the outlet radius (consequently no Francis turbines).

Figure 2:
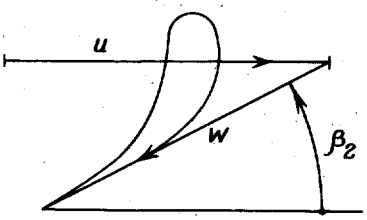
Fig. 2 is a further chart and shows the circumferential velocity at the outlet of the turbine as plotted against the relative discharge velocity and the outlet angle.

(*b*) The blades of the secondary wheel form flat angles with the circumference at the outlet whereby the peripheral velocity $u$ at the outlet of the turbine must be of the magnitude of the relative discharge velocity $w$ at this point which results in the outlet angles being smaller than 35 degrees (Fig. 2).

(*c*) The blades of the secondary wheel must be substantially thickened at the inlet and eventually rounded off.

(*d*) The guide means or/and the secondary wheel consist of two rims one of which carries blades continually operative while the other rim carries supplementary blades used for slow angular speeds and which at higher angular speed are withdrawn from action. The totality of these features results in the surprising progress here disclosed.

The addition hitherto usual of centripetal turbines of the Francis type (inlet radius larger than outlet radius) to the pump which works here with very variable delivery heads (and quantities of water sensibly impairs e. g. the increase of torque of turbines showing the features (*a*) or (*b*)+(*c*).

The great increase of the momentum intended by the invention cannot be attained with gears having steep blade angles or blades insufficiently thickened.

The substantially thickened blade heads, per se known in water turbines, serve here the special purpose of sufficiently safely providing for the highly increased torque (particularly during the start) by means of preferably one single turbine rim, in a way which is satisfactory hydraulically and with respect to mechanical strength, whereas this torque was distributed over 2 or 3 turbine rims in the earlier types (U. S. Patent 1,900,120).

The invention is further based on the following important finding:—Occasionally it had been observed on the old Fourneyron turbines (outlet radius larger than inlet radius) that the torque characteristic was slightly curved upward towards the hard-braking point (see Escher-Dubs "Die Theorie der Wasserturbinen", 3rd edition, page 2 and pages 171–174). These turbines built into rivers, however, work under other hydraulic conditions than the present transmission gears (torque transformers):—In spite of the angular speed varying between normal and zero the height of fall of the river remains constant. In the self-contained transmission gear, however, not only the head of the turbine but also the quantity of water change sensibly, since in the short-circuited circuit a reaction directly takes place on the pump which does not furnish any constant head of water but a head which very sensibly varies with the quantity of water delivered (cf. the Q–H characteristic). The quantity of water, however, adjusts itself in such a way that the total resistances in the pump, turbine and guide apparatus (friction, shocks and head utilized) are overcome.

The finding that the particular application of smaller inlet radii with larger or, at the most, equal outlet radii of the turbine is, among other things, decisive for surprisingly high increases of the torque under the particularly intricate conditions of flow in the present transmission gears, represents a substantial progress in transmission engineering, especially as it permits of doing away with the prejudice that the Francis turbine (with larger inlet and smaller outlet radii), which is advantageous for the maximum efficiency, is also superior for the spontaneous increase of the tractive effort in the start.

Fig. 2 shows one of the usual turbine triangles in which according to the invention the circumferential velocity $u$ and the velocity of flow (here the relative velocity at the channel outlet) are of about the same magnitude. In the case of hard braking $w$ is sensibly increased. The blade angles $\beta_2$ are then smaller than 35 degrees, while in the case of larger angles unsatisfactory ratios $u/w$ would be the result (viz. too small $u$ as compared with $w$). The blade may e. g. have the rounded shape shown which is per se known in steam turbines, propellers, pumps and water turbines, it may, however, also be pointed in a suitable manner but at any rate it must have substantially thickened inlet ends.

Figure 3:
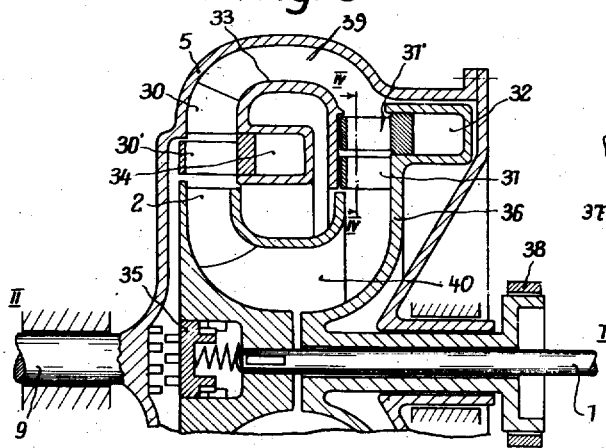
Fig. 3 is a partial section through a hydraulic transmission gear according to the invention.

In the embodiment shown by Fig. 3 the primary shaft 1 carries the pump wheel 2, which delivers the water into the coaxial turbine or secondary wheel 30, 30' which is coupled with the secondary shaft 9 by means of the disc 5. From here the water flows through a bladeless channel 39 to the guide rims 31, 31' disposed opposite to the secondary wheel and finally back through the bladeless channel 40 into the pump.

The guide rim 31 is supported by a carrier 36 which can, as desired, rotate on or with the primary shaft 1 or may be immobilized against rotating by the brake 38.

At the maximum speed the guide device may be freed by a release of the hard braking at 38 so that the circuit is converted into a soft hydraulic clutch. At the maximum running speed the latter may be replaced by a rigid coupling consisting in a tooth or friction clutch 35 so that the efficiency $\eta$ is raised to practically 100% and all means today available for the increase of tractive effort and efficiency are combined within a minimum of space.

For increasing the tractive effort and at the same time the efficiency the guide device consists of two rims 31, 31' the one of which 31' being adapted to be inserted into the circuit or withdrawn into the chamber 32 according to the speed desired in an axial direction into the same circuit.

According to the invention, this measure can be further improved by not only a second guide apparatus but also a second turbine wheel 30' being inserted in a suitable way, e. g. also by an axial displacement into and from the chamber 34. Then a turbine wheel adapted to the particular running speed will correspond to each guide apparatus (Fig. 3).

In some instances this will, however, present the disadvantage that the mechanical connection between the casing 5 and the core 33 of the circuit or other corresponding members is lost so that special supporting blades leaving the twist substantially unchanged must be used in order to reestablish this connection.

This inconvenience by itself not essential can be overcome according to the invention by the particular guide blades of the guide device and/or the blades of the turbine being each divided into an inlet and an outlet part the latter of which is continually used and at the same time connects the outside wall 5 and the internal core 33 of the circuit with one another while the inlet part is so shaped that it completes the outlet part suited for high and medium speeds only, to a kind of hooked blade which is on the contrary adapted to low speeds and particularly to the development of maximum tractive efforts for starting. By this arrangement the double or multiple branched circuits for transmission gears as disclosed by earlier patents of the inventor are so to speak combined into a single circuit so that an essential simplification and improvement of the set is obtained, the more so as it was found out that the pump in any instance common to the latter can show definite properties which are hydraulically advantageous for either running speed.

Figure 4:
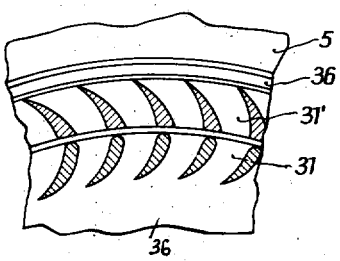
Fig. 4 is a partial section through Fig. 3 according to the line IV—IV and seen in the direction of the arrows.

Fig. 4 shows such special blades consisting each of an inlet part 31' and an outlet part 31 and which are suited for the change both of the guide device and of the turbine impellers. 31 e. g. has the typical shape of the reaction blades corresponding to high and medium speeds of the turbine while the combination of 31' and 31 results in an advantageous action or impulse turbine blading.

Figure 5:
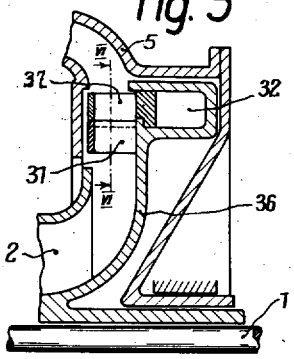
Fig. 5 shows the right part of Fig. 3 and illustrates another embodiment of the guide blades.
Figure 6:
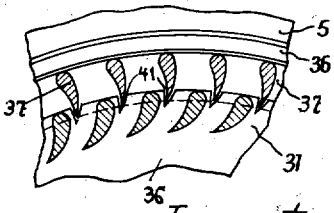
Fig. 6 is a section through Fig. 5 according to the line VI—VI seen in the direction of the arrows.

According to a further embodiment of the invention shown in Figs. 5 and 6 the supplementary blades are so arranged as to partially overlap the thickened heads of the continually operative blades 31. The rim of these supplementary or split blades 37 may be inserted and withdrawn by an axial displacement, slots 41 being provided for this purpose in the carrier 36.

In Fig. 3, 31 is the rim continually used in the guide device while 31' is the supplementary rim which is adapted to disappear in the chamber 32 connected with the stationary guide device. The displacement is e. g. accomplished in the well-known way by the hydraulic pressure in the gear itself as illustrated and described in the inventor's Patent No. 1,199,361. This feature is long known and therefore not a subject matter of the present invention. The supplementary rim 31' is naturally disposed in the direction of flow in front of the outlet rim 31 continuously used, viz. in the present instance at a larger radius than 31.

In the same way the turbine outlet rim 30 may also, for the development of the maximum starting tractive efforts and efficiencies, be rigidly connected with the casing 5 and the core 33 while in the case of medium and high running speeds the supplementary rim 30' can disappear into the chamber 34 of the secondary runner. The rim-receiving chambers 32 and 34 may be disposed as desired either within the core or on the outside of the casing.

A further advantage of the invention consists in that, if desired, it is possible to obtain an additional braking effect by means of the hydraulic gears. This effect is particularly desirable in the case of long descents or when the driver encounters an unexpected obstruction so that braking with any possible means imposes itself. After having reached a certain speed the hydraulic gear will as a rule be used as a coupling or the driver will have the car to run with a direct mechanical clutch engagement so that according to the above statement it would be necessary to render the guide device inoperative in the circuit either by free running or by a withdrawal from the circuit.

When now with such a speed the secondary shaft is to be braked, the guide wheel is inserted again by being immobilized or returned into the circuit. In the same way in which initially a sensible increase of the torque was obtained in the start, the guide device being inserted, viz. the transition from the coupling to the torque transforming effect, will result in a powerful braking action on the secondary part. A particularly powerful braking effect is obtained by the primary shaft, for instance the engine, being braked to stoppage. In either instance the hydraulic gear acts as a water brake.

The essential features of the invention as characterized in the claims are naturally appliable independently of any particular features described and the embodiments shown by the drawing are also readily appliable to embodiments of turbines, pumps and hydraulic transmission gears in a general way.

I claim:

1. A hydraulic transmission gear for an intensified automatic torque increase at the start, comprising a primary pump wheel, only one secondary wheel the inlet radius of which does not exceed the outlet radius, and the blades of which, substantially thickened at the inlet and eventually rounded off, and formed with flat angles, $\beta_2$ with the circumference at the outlet whereby the the relative discharge velocity ($w_2$) and the peripheral velocity ($u_2$) at that point are of substantially the same magnitude at the normal angular speed of maximal efficiency ($n_{norm}$), a chamber connecting the outlet of the secondary wheel with the inlet of the pump wheel, guide means operable in said chamber and consisting of two rims one of which carries guide blades continually operative while the other rim carries supplementary blades for slow angular speeds of the secondary wheel, and means for rendering the supplementary blades inoperative at higher angular speeds.

2. A hydraulic transmission gear for an intensified automatic torque increase at the start, comprising a primary pump wheel, only one secondary wheel the inlet radius of which does not exceed the outlet radius, and the blades of which, substantially thickened at the inlet and eventually rounded off, form flat angles $\beta_2$ with the circumference at the outlet whereby the relative discharge velocity ($w_2$) and the peripheral velocity ($u_2$) at that point are of substantially the same magnitude at the normal angular speed of maximal efficiency ($n_{norm}$), a chamber connecting the outlet of the secondary wheel with the inlet of the pump wheel, guide means operable in said chamber, the secondary wheel consisting of two rims one of which carries blades continually operative while the other rim carries supplementary blades operative for slow angular speeds of the secondary wheel, and means for withdrawing the supplementary blades from action at higher angular speeds.

3. A hydraulic transmission gear according to claim 1, in which also the secondary wheel consists of two rims, one of which carries blades continually operative while the other rim carries supplementary blades for slow angular speeds of the secondary wheel and which at higher angular speeds are withdrawn from action by axial displacement.

4. A hydraulic transmission gear according to claim 1 in which the supplementary blades being so arranged as to overlap the thickened heads of the continually operative blades.

5. A hydraulic transmission gear for an intensified automatic torque increase at the start, comprising a primary pump wheel, a secondary wheel, the inlet radius of which does not exceed the outlet radius, and the blades of which, substantially thickened at the inlet and eventually rounded off, form flat angles $\beta_2$ with the circumference at the outlet whereby the relative discharge velocity ($w_2$) and the peripheral velocity ($u_2$) at that point are of the substantially same magnitude at the normal angular speed of maximal efficiency ($n_{norm}$), a chamber connecting the outlet of the secondary wheel with the inlet of the pump wheel, guide means operable in said chamber and consisting of two rims one of which carries guide blades continually operative while the other rim carries supplementary blades for slow angular speeds of the secondary wheel and means for rendering the supplementary blades inoperative at higher angular speeds and the guide means being arranged on the side of the circuit opposite to the side of the secondary wheel.

6. A hydraulic transmission gear for an intensified automatic torque increase at the start, comprising a primary pump wheel, a secondary wheel, the inlet radius of which does not exceed the outlet radius, and the blades of which, substantially thickened at the inlet and eventually rounded off, form flat angles $\beta_2$ with the circumference at the outlet whereby the relative discharge velocity ($w_2$) and the peripheral velocity ($u_2$) at that point are of the substantially same magnitude at the normal angular speed of maximal efficiency ($n_{norm}$), a chamber connecting the outlet of the secondary wheel with the inlet of the pump wheel, guide means operable in said chamber and consisting of two rims one of which carries guide blades continually operative while the other rim carries supplementary blades for slow angular speeds of the secondary wheel and means for rendering the supplementary blades inoperative at higher angular speeds and the guide means being arranged on the side of the circuit opposite to the side of the secondary wheel, and a bladeless channel provided between the outlet of the turbine wheel and the inlet of the supplementary guide blades.

HERMANN FÖTTINGER.